United States Patent
Adams et al.

(10) Patent No.: US 7,112,622 B2
(45) Date of Patent: Sep. 26, 2006

(54) ORGANIC BASED THERMAL STABILIZERS AND HEAT STABILIZED POLYMER COMPOSITIONS

(75) Inventors: Paul Brian Adams, Hamilton, OH (US); Tod Charles Duvall, West Chester, OH (US); Gene Kelly Norris, West Chester, OH (US)

(73) Assignee: Rohm and Haas Company, Philadelphia, PA (US)

( * ) Notice: Subject to any disclaimer, the term of this patent is extended or adjusted under 35 U.S.C. 154(b) by 118 days.

(21) Appl. No.: 10/378,404

(22) Filed: Mar. 3, 2003

(65) Prior Publication Data

US 2003/0227006 A1 Dec. 11, 2003

Related U.S. Application Data

(60) Provisional application No. 60/362,285, filed on Mar. 7, 2002.

(51) Int. Cl.
*C08K 5/34* (2006.01)
*C08K 5/48* (2006.01)
*C08G 18/80* (2006.01)
*C08G 73/10* (2006.01)

(52) U.S. Cl. .......... 524/86; 524/104; 524/198; 524/399; 524/400; 252/400.1; 252/400.52

(58) Field of Classification Search .......... 524/86, 524/104, 198, 399, 400; 252/400.1, 400.52, 252/400.4, 100.52, 100.4
See application file for complete search history.

(56) References Cited

U.S. PATENT DOCUMENTS

| | | | |
|---|---|---|---|
| 2,985,617 A | 5/1961 | Salyer et al. | |
| 3,078,290 A | 2/1963 | Hechenbleikner | |
| 3,275,592 A * | 9/1966 | Oswald et al. | 524/101 |
| 3,503,924 A | 3/1970 | Pollock et al. | |
| 3,507,827 A | 4/1970 | Pollack et al. | |
| 3,943,081 A | 3/1976 | Brook | |
| 4,178,282 A | 12/1979 | Bae | |
| 4,360,619 A | 11/1982 | Kugele et al. | |
| 4,751,261 A | 6/1988 | Miyata et al. | |
| 4,782,170 A | 11/1988 | Bae et al. | |
| 5,938,977 A | 8/1999 | Rosenthal et al. | |
| 5,939,480 A * | 8/1999 | Lee et al. | 524/296 |
| 6,232,380 B1 | 5/2001 | Conroy et al. | |
| 6,326,518 B1 | 12/2001 | Duvall et al. | |
| 6,348,164 B1 * | 2/2002 | Khattar et al. | 252/404 |
| 6,528,566 B1 | 3/2003 | Duvall et al. | |
| 6,537,466 B1 | 3/2003 | Duvall et al. | |
| 6,548,707 B1 | 4/2003 | Duvall et al. | |
| 6,559,214 B1 | 5/2003 | Duvall et al. | |
| 6,573,318 B1 | 6/2003 | Duvall et al. | |
| 6,610,218 B1 | 8/2003 | Duvall et al. | |
| 6,689,893 B1 * | 2/2004 | Reddy et al. | 554/156 |
| 6,706,792 B1 | 3/2004 | Duvall et al. | |
| 2002/0091179 A1 | 7/2002 | Norris | |
| 2003/0158311 A1 | 8/2003 | Adams et al. | |

FOREIGN PATENT DOCUMENTS

| | | |
|---|---|---|
| AU | 48232/96 | 10/1996 |
| DE | 3021112 | 12/1981 |
| DE | 19741778 | 3/1998 |
| EP | 0070092 | 1/1983 |
| EP | 0224679 | 6/1987 |
| EP | 0945484 | 9/1999 |
| EP | 0945485 | 9/1999 |
| EP | 0987295 | 3/2000 |
| EP | 0742259 | 10/2000 |
| EP | 1055704 | 11/2000 |
| EP | 1201706 | 2/2002 |
| GB | 1248531 | 10/1971 |

OTHER PUBLICATIONS

S. Senda and K. Hirota Purimidine Derivatives and Related Compounds. XXII. Synthesis and Pharmoacological Properties of 7-Deazaxanthine Derivatives:, Chem. Pharm. Bull., 22(7) 1459-1467 (1974).

* cited by examiner

*Primary Examiner*—Kriellion Sanders
(74) *Attorney, Agent, or Firm*—Marcella M. Bodner; Paul Chirgott

(57) ABSTRACT

The present invention encompasses a novel organic based composition which includes at least one organic based heat stabilizer component, and at least one stabilizer modifying component selected from the group of liquid calcium soap and 1,3,5-tris (2-hydroxyethyl) cyanuric acid. The invention also encompasses heat stabilized polymer compositions made with the novel organic based composition disclosed herein.

8 Claims, No Drawings

ORGANIC BASED THERMAL STABILIZERS AND HEAT STABILIZED POLYMER COMPOSITIONS

CROSS REFERENCE TO RELATED PATENT APPLICATION

This is a non-provisional application of prior pending U.S. provisional application Ser. No. 60/362,285 filed on Mar. 7, 2002.

This invention relates to organic based thermal stabilizers. It also relates to heat stabilized polymer compositions, particularly those polymers compositions which are normally susceptible to heat-induced deterioration during extrusion, injection molding and other processing of the composition at an elevated temperature such as halogen-containing polymer compositions. This invention also relates to articles of manufacture that are prepared from such heat-stabilized polymer compositions.

BACKGROUND OF THE INVENTION

The physical properties of various organic polymers deteriorate and color changes take place during processing of the polymer and during exposure of formed polymer products to certain environments. Prime examples of such polymers include halogen-containing polymers, which are normally susceptible to heat-induced deterioration through autoxidation. When such polymers are processed at elevated temperatures, undesirable color changes often occur within the first 5 to 10 minutes as well as during later stages of the processing. Haziness, which sometimes accompanies the color changes, is particularly undesirable where clear products are needed. The addition of heat stabilizers to such polymers has been absolutely essential to the widespread utility of the polymers.

Two principal classes of heat stabilizers, organotin compounds and mixed metal combinations, are known in the art. Organotin-based heat stabilizers are the most efficient and widely used stabilizers for rigid PVC. Synergistic combinations of alkyltin mercaptides and free mercaptans are taught by Kugele et al in U.S. Pat. No. 4,360,619 to be particularly efficient heat stabilizers for rigid PVC during extrusion.

Whereas oxidation of the free mercaptans diminishes the above-noted synergism and the oxidative stability of the mercaptans is often very poor, oxidatively stable latent mercaptans have been described more recently as being unexpectedly active heat stabilizers for PVC and other halogen-containing polymers in the absence of such other compounds. It has been found that the thermal stability provided by the latent mercaptans may be activated in the presence of a zinc compound even though the zinc compound promotes PVC degradation.

The use of liquid stabilizer systems to overcome the problem of Aplating out associated with solid state combinations of mixed barium-cadmium salt stabilizers is addressed in U.S. Pat. No. 4,782,170. There, Bae et al say that liquid systems comprising barium alkyl phenates and cadmium carboxylates had been judged to be the most effective stabilizers and that the known stabilizers in which the toxic cadmium was replaced by zinc and zinc/calcium combinations were not as effective.

While discussing the degradation of polyvinyl chloride by zinc chloride, Bae et al mention that simple solutions of alkaline earth metal soaps with zinc chloride and hydroxy compounds are taught in U.S. Pat. No. 3,943,081 and also in U.S. Pat. No. 4,178,282.

Although polyvinyl chloride compositions comprising zinc stearate, calcium carbonate, hydrotalcite, and tris (2-hydroxyethyl) isocyanurate are reported in U.S. Pat. No. 5,938,977 to have good yellowing prevention during weathering, the use of tris (2-hydroxyethyl) isocyanurate in organic stabilizers for PVC has not been reported.

It is an object of this invention to hinder the zinc-catalyzed degradation of halogen-containing polymers at the elevated temperatures encountered during processing.

It is another object of this invention to provide a halogen-containing polymer composition having an increased level of heat stability.

These and other objects and advantages of the invention that will become apparent from the following description are achieved by a novel organic based composition comprising at least one organic based heat stabilizer component, and at least one stabilizer modifying component selected from the group consisting of liquid calcium soap and 1,3,5-tris (2-hydroxyethyl) cyanuric acid. The invention also includes heat stabilized polymer compositions made with the novel organic based composition disclosed herein.

The novel organic stabilizer of the present invention comprises at least one organic based heat stabilizer component. As used herein, the term "organic based heat stabilizer component" encompasses the family of heat stabilizers which are essentially free of heavy metals. Examples of such are known to those skilled in the art.

One particularly preferred family of compositions encompasses by the term organic based heat stabilizer component comprises a zinc salt, and at least one sulfur compound selected from the group consisting of a free mercaptan, a zinc mercaptide, and a latent mercaptan.

For the purposes of this invention, the terms "blocked mercaptan" and "latent mercaptan" are used interchangeably to mean a thioether which degrades during processing of the composition at an elevated temperature to liberate a free mercaptan. Other products of the degradation of the latent mercaptan are believed to include carbocations of the blocking moiety, which are stabilized by a molecular structure in which several groups share the electron deficiency. Resonance stabilization and neighboring group stabilization are two of the possible mechanisms by which the carbocations may be stabilized. The carbocations act as intermediates in the formation of stable compounds early in the hot processing of halogen-containing polymers. Although such mechanisms and the resultant carbocations are believed to be an impetus for the liberation of a free mercaptan, this invention is in no way limited by the foregoing attempt to explain the working of the invention. Those skilled in the art will see the resonance stabilization and neighboring group stabilization that are possible in the following structures of the blocked mercaptan; other mechanisms may be at work in other blocked mercaptans represented by these structures that also liberate a free mercaptan upon thermal and/or chemical degradation during processing of polymeric compositions containing such blocked mercaptans. The compounds used for blocking the mercaptan group in the latent mercaptans of this invention are preferably those that are capable of furnishing a stabilized carbocation having a molecular structure in which the electron deficiency is shared by several groups. Resonance stabilization and neighboring group stabilization are two of the possible mechanisms by which the carbocations may be stabilized.

The latent mercaptan is exemplified by those having Formula 1:

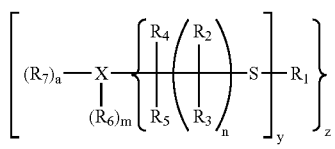

wherein a is 0 or 1, m and n are 0 or 1; y=1 to 4; when y=1, z is 1 to 4; and when y is more than 1, z is 1; $R_1$ is an alkyl, alkylenyl, cycloalkyl, cycloalkylenyl, aryl, alkaryl, aralkyl, aralkylenyl, hydroxyalkyl, dihydroxyalkyl, hydroxy(polyalkoxy)alkyl, alkoxyalkyl, hydroxyalkoxyalkyl, alkoxy(hydroxyalkyl), alkoxy(acyloxyalkyl), alkoxy(polyalkoxy)alkyl, alkoxy(polyalkoxy)carbonylalkyl, carboxyalkyl, acyloxyalkyl, acyloxy(hydroxyalkyl), acyloxyalkoxyalkyl, acyloxy(polyalkoxy)alkyl, benzoyloxy(polyalkoxy)alkyl, alkylenebis-(acyloxyalkyl), alkoxycarbonylalkyl, alkoxycarbonylalkylenyl, hydroxyalkoxycarbonylalkyl, hydroxy(polyalkoxy)carbonylalkyl, mercaptoalkyl, mercaptoalkylenyl, mercaptoalkoxycarbonylalkyl, mercaptoalkoxycarbonylalkylenyl, alkoxycarbonyl(amido)alkyl, alkylcarbonyloxy(polyalkoxy)carbonylalkyl, tetrahydopyranyloxy(polyalkoxy)carbonylalkyl, tetrahydropyranyloxyalkyl, hydroxyaryl, mercaptoaryl or carboxyaryl radical having from 1 to 22 carbon atoms; $R_2$, $R_3$, $R_4$, $R_5$, $R_6$, and $R_7$ are independently hydrogen, a hydroxyl, mercapto, acyl, alkyl, alkenyl, alkylenyl, aryl, haloaryl, alkaryl, aralkyl, hydroxyalkyl, mercaptoalkyl, hydroxyaryl, alkoxyaryl, alkoxyhydroxyaryl, mercaptoaryl groups having from 1 to 22 carbon atoms; X is aryl, haloaryl, alkaryl, aralkaryl hydroxyaryl, dihydroxyaryl, arylcycloalkyl, or a heteroatom, with the option that when a is 1 and m is 1, $R_6$ and $R_7$ form a heterocyclic moiety in conjunction with X as nitrogen, and with the further option that when a=1 and m=0, one of $R_1$, $R_3$, and $R_5$ joins with $R_7$ and X to form a heterocyclic moiety with X as a heteroatom selected from the group consisting of oxygen and sulfur; with the proviso that z is 1 or 2 when X is aralkaryl, $R_6$ and $R_7$ are hydroxyl, a is 1 and m is 1, and with the further proviso that when $R^6$ is not hydroxyl or mercapto, z is 1.

The free mercaptan used in this invention is one that is added separately from the latent mercaptan and is not a product of the degradation of the latent mercaptan during processing of the halogen-containing polymer composition of this invention. Any one or more of the mercaptan-containing compounds described hereinbelow as precursors of latent mercaptans may also be used in this invention as a free mercaptan.

The zinc mercaptides useful when practicing certain embodiments of this invention are also derivatives of said mercaptan-containing compounds described herein below and may be made, for example, by the reaction of zinc chloride with a mercaptan such as a mercaptoester in which the mercapto group is in either the alkoxy alkyl moiety or the alkoxycarbonyl alkyl moiety or both in the presence of a hydrogen chloride acceptor. They may be made by the reaction of zinc oxide with the mercaptan in a medium such as a wax whereby water is removed as a by-product by distillation.

As used herein, the term halogen-containing polymer composition means a composition comprising a halogen-containing polymer in which the halogen is attached directly to a carbon atom. Poly (vinyl chloride), copolymers of vinyl chloride and vinyl acetate, and poly (vinylidene chloride) are the most familiar polymers, which require stabilization for their survival during fabrication into pipe, window casings, siding, bottles, wall covering, and packaging film.

A rigid polymer composition is one that does not contain a plasticizer. A semi-rigid composition is one that contains from 1 to 25 parts of a plasticizer per 100 parts by weight of the halogen-containing polymer. A flexible composition contains from 25 to 100 parts of the plasticizer per 100 parts by weight of the halogen-containing polymer.

The hydrocarbyl radicals of Formula 1 contain from 1 to 20 carbon atoms and may have up to 3 ethylenic double bonds; likewise, the hydrocarbyl portions of hydroxyalkyl, mercaptoalkyl, and alkoxyalkyl radicals, and the like. As used herein, the term alkylenyl represents divalent, trivalent, and tetravalent straight or branched chain hydrocarbon radicals; the term oxyalkylenyl represents a divalent radical of a polyalkylene ether molecule; and the term alkenyl means a hydrocarbyl radical having a double bond in its chain of carbon atoms.

Also, as used herein: an acyloxyalkyl radical originates from a carboxylic acid ester of an alkyl alcohol; the $R_1$ radical in Formula 1, therefore, in the stearic acid ester of mercaptopropanol is the stearoyloxypropyl radical; likewise, the $R_1$ radical of the oleic acid ester of mercaptopropanol is the oleyloxypropyl radical. On the other hand, the R1 radical of an ester of a mercaptocarboxylic acid and an alkanol is an alkoxycarbonylalkyl radical, i.e., the $R_1$ radical of lauryl-3-mercaptopropionate is dodecyloxycarbonylethyl.

The phrase "parts per hundred parts of resin is abbreviated herein as "phr". Also, as used herein for the purposes of this invention, substantially means largely if not wholly that which is specified but so close that the difference is insignificant.

The novel organic stabilizer of the present invention also comprises at least one stabilizer modifying component selected from the group consisting of liquid calcium soap and 1,3,5-tris (2-hydroxyethyl) cyanuric acid.

The term "liquid form of a calcium soap" is used interchangeably with "liquid calcium soap" herein and means a solution of a calcium soap which is a liquid at 105° C. and is substantially free from other metal salts. Calcium soaps suitable for the purposes of this invention are organic solvent-soluble, water-insoluble salts of at least one carboxylic acid selected from the group consisting of aliphatic acids having from eight to twenty-two carbon atoms, aromatic acids having from seven to 22 carbon atoms, and mixtures of one or more of said acids with aliphatic carboxylic acids having from two to seven carbon atoms, all of said aliphatic acids being saturated or unsaturated, straight or branched chain acids.

Examples of the saturated straight chain acids include octanoic, lauric, myristic, palmitic, and stearic acids. Examples of the branched chain acids include 2-ethyl hexanoic, iso-octanoic, 1,1-dimethyl hexanoic, 3,5,5-trimethyl hexanoic, 2-methyl-2-ethyl hexanoic, and neodecanoic acids. Examples of the unsaturated acids include oleic, linoleic, linolenic, ricinoleic, and erucic acids. Examples of the aromatic acids include benzoic, toluic, cumic, hemellitic, xylic, and dodecylbenzoic acids.

The carboxylates (soaps) may be liquefied by carrying out the formation of the soap in a high boiling organic solvent that dissolves the soap as it forms. The solvent preferably has a boiling point of about 180° C. and is preferably used in an amount not exceeding about 25% of the total weight of the stabilizer composition (i.e., the free and/or latent mercaptan plus the liquid calcium soap plus the zinc salt). Useful solvents include aliphatic, cycloaliphatic, and aromatic hydrocarbons and alcohols, esters of organic acids such as benzoic, oleic and acetic acid, ether alcohols, and ether alcohol esters. Mixtures of solvents, such as a high boiling naphtha and butyl carbitol, are often quite useful. A glyceryl mono-oleate or a mixture of the mono-oleate and di-oleate of glycerol are further examples of solvents suitable for the purposes of this invention. Calcium versalate, an eight-carbon carboxylate sold by the Shepherd Chemical Company, is a prime example of the liquid calcium soaps contemplated for use in this invention.

The mercaptan-containing organic compounds that may be converted into latent mercaptans for the purposes of this invention are well known compounds and include alkyl mercaptans, mercapto esters, mercapto alcohols, and mercapto acids. See, for example, U.S. Pat. Nos. 3,503,924 and 3,507,827. Alkyl mercaptans having from 1 to 200 carbon atoms and from 1 to 4 mercapto groups are suitable. Mercaptan-containing organic compounds that include $R_1$ have structures illustrated by the following formulas:

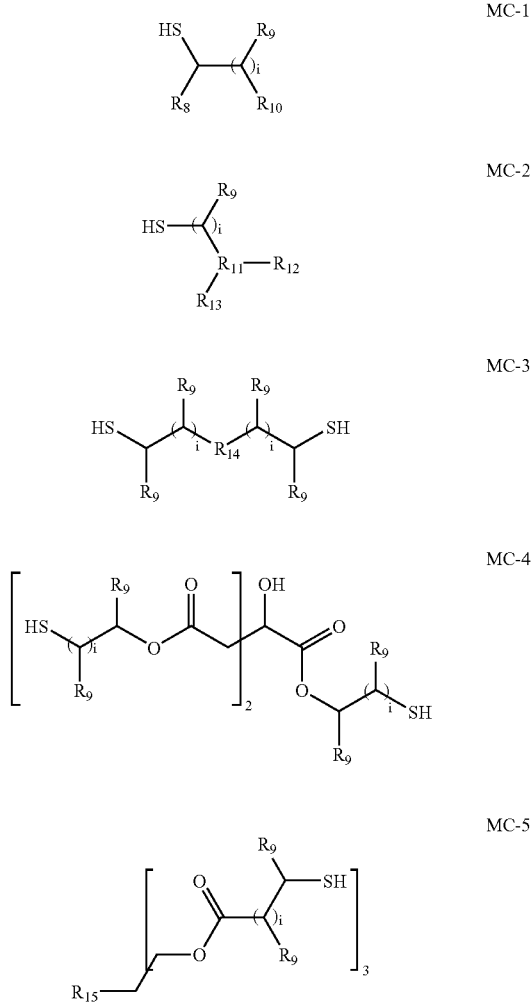
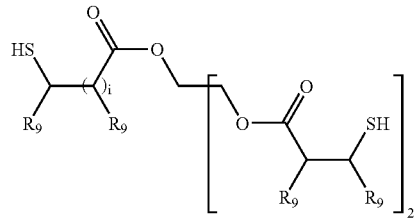

wherein $R_8$ and $R_9$ are the same or different and are $R_{16}C(=O)—O, R_{16}—OC(=O), —OH, —SH$, aryl, $C_1$ to $C_{18}$ alkyl, or —H;

$R_9$ is —H, aryl, or $C_1$ to $C_{18}$ alkyl;

$R_{11}$ is cycloalkyl, cycloalkenyl or phenyl;

$R_{12}$ is $R_{16}C(=O)—O, R_{16}—OC(=O), —SH$, aryl, $C_1$ to $C_{18}$ alkyl, —OH or —H, with the provisco that when $R_{11}$ is phenyl, $R_{12}$ is —OH and i=0 in formula (MC2), the —SH groups are on non-adjacent carbon atoms;

$R_{13}$ is —H or a divalent group which may contain halogen, hydroxy, mercapto or alkyl substituents and which when $R_{11}$ is phenyl combines with the phenyl to form a naphthalene ring;

$R_{14}$ is

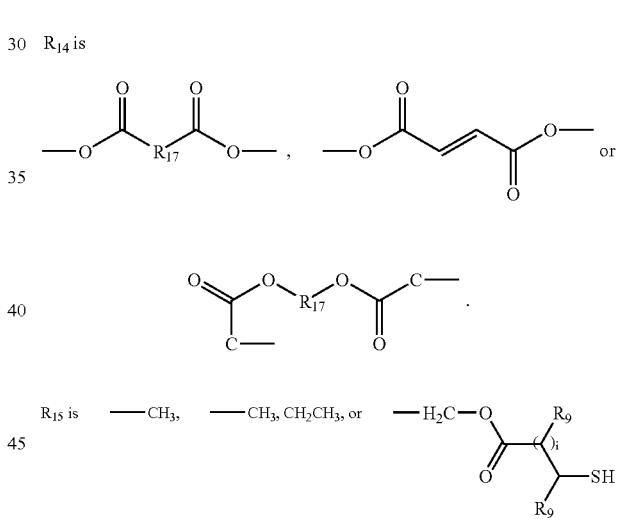

$R_{16}$ is —H, or alkyl, alkenyl, aryl, aralkyl, alkaryl, cycloalkyl, cycloalkylenyl;

$R_{17}$ is arylene, $C_1$ to $C_8$ alkylenyl,

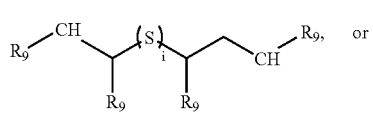

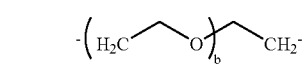

wherein b is an integer from 1 to 6;

i=0 or an integer from 1 to 6 inclusive;

j=0, 1, 2 or 3; and f=1 or 2.

Mercaptan-containing organic compounds preferred as intermediates in the preparation of the latent mercaptans of this invention are those compounds according to formula (MC1) where $R_9$ is —H, $R_{10}$ is —H, $R_8$ is OH; $R_{16}C(=O)O$; $R_{16}OC(=O)$; and i=1; those compounds according to formula (MC2) where $R_{11}$ is phenyl, $R_9$ is —H, $R_{12}$ is —H, $R_{13}$ is —H, i=1, and j=1; those compounds according to formula (MC3) where $R_9$ is —H, $R_{14}$ is —OC(=O)CH=CHC(=O)—O— to formula (MC4) where $R_9$ is —H and i=1; those compounds according to formula (MC5) where and i=1; those compounds according $R_{15}$ is —$C_2H_5$ or

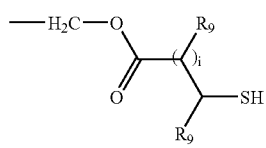

$R_9$ is —H and i=1; and those compounds according to formula (MC6) where $R_9$ is —H and i=1.

The blocking compounds are preferably those that are capable of furnishing a stabilized carbocation having a molecular structure in which several groups share the electron deficiency. Resonance stabilization and neighboring group stabilization are two of the possible mechanisms by which the carbocations may be stabilized. Polarized, unsaturated compounds exemplified by 3,4-dihydropyran, 2-methoxy-3,4-dihydropyran, styrene, "∀-methylstyrene, vinyl benzyl chloride, indene, 2-vinylpyridine, N-vinylpyrrolidone, vinyl acetate, octadecyl vinyl ether, cyclohexyl divinyl ether, ethyleneglycol monovinyl ether, allyl phenyl ether, trans-cinnamaldehyde, N-methyl-N-vinylacetamide, N-vinylcaprolactam, isoeugenol, and 2-propenylphenol are among those suitable. Other suitable compounds include 3,4-dihydro-2-methoxy-2H-pyran; 3,4-dihydro-2-ethoxy-2H-pyran; 3,4-dihydro-2-phenoxy-2H-pyran; 3,4-dihydro-2-formyl-2H-pyran; and 2,3-dihydrofuran. The 3,4-dihydro-2-formyl-2H-pyran is made by the Diels-Alder dimerization of acrolein at high temperatures and pressures. The 3,4-dihydro-2-alkoxy-2H-pyrans and 3,4-dihydro-2-phenoxy-2H-pyran are made by the reaction of the corresponding vinyl ether with acrolein in the presence of a catalytic amount of a zinc salt, e.g., zinc chloride. A variety of 3,4-dihydro-2H-pyrans having a substituent in the 2-position can be made by similar reactions. The products formed by the reaction of 1 and 2 moles of acrolein with the divinyl ether of an alkylene or polyalkylene glycol are blocking agents, also. The latent mercaptans made from the di-(3,4-dihydropyranyl) ethers also have the potential of being chelating agents in the polymer compositions of this invention. Compounds having labile halogen atoms which split off as hydrogen chloride in a condensation reaction with the mercaptan, as exemplified by triphenylmethyl chloride, benzyl chloride, and bis(chloromethyl)benzene, are also suitable. The mercaptan may also be blocked by condensation with an aldehyde such as butyraldehyde or with a benzyl alcohol such as benzene dimethanol. The preferred blocking agents include 3,4-dihydropyran (DHP). Blocked mercaptans made from DHP are at times referred to hereinafter as DHP/name of free mercaptan (e.g., DHP/mercaptoethanol).

In general, the procedure for making latent mercaptans that are useful in this invention comprises adding the mercapto group of the free mercaptan across the double bonds of polarized, unsaturated compounds is as follows:

To a stirred mixture, under nitrogen atmosphere, of the mercaptan, acid catalyst, and optionally, a small percentage of antioxidant to inhibit radical reactions, is added dropwise to the polarized, unsaturated compound, either neat or in solution, while maintaining the temperature between 10–70° C. The mixture or solution is then heated for between 1 and 6 hours at 35–70° C. and conversion to product is monitored by gas chromatography and iodine titration for SH. The acid catalyst is removed by an alkaline wash and the resulting product is dried with magnesium sulfate and filtered. The solvent, if required, is removed under reduced pressure at <50° C. to yield the latent mercaptan. A solid phase catalyst may be used and then filtered out of the reaction mixture and regenerated for use in a subsequent synthesis. In this way, a wash step is eliminated. This generalized procedure is referred to hereinafter as Procedure A.

In accordance with Procedure A, for example, mercaptoethanol is added across the double bond of N-vinylcaprolactam to yield N-2-hydroxyethylthioethyl-caprolactam. Mercaptoethyldecanoate (mercaptoethylcaproate) reacts with 3,4-dihydropyran in that procedure to give 2-S-(tetrahydropyranyl)thioethyldecanoate. Bis(hydroxyethyl-thioethyl) cyclohexyl ether is made from the mercaptoethanol and cyclohexyl di-vinyl ether. In like manner, the corresponding caprate, oleate, and tallate esters form the corresponding cyclohexyl ethers. Also, indene is converted by the addition of the mercaptoethanol to 2H-dihydroindenylthioethanol. A generalized procedure for the condensation of a free mercaptan with a labile halogen-containing compound is as follows:

To a stirred mixture of the mercaptan and halogen-containing compound under nitrogen atmosphere is added dropwise a solution of sodium methoxide in methanol while maintaining the temperature below 50° C. Optionally, the reaction is allowed to proceed without the addition of a base source and the liberated hydrogen chloride is removed by nitrogen gas sweep and neutralized with the use of an external acid scrubber. The mixture or solution is then heated for between 2 to 24 hours at 50–70° C. and conversion to product is monitored by gas chromatography and iodine titration for % SH. The product is then neutralized, washed with water, dried with magnesium sulfate, and filtered. The solvent, if required, is removed under reduced pressure at <50° C. to yield the latent mercaptan. This generalized procedure is referred to hereinafter as Procedure B.

A generalized procedure for the condensation of a free mercaptan with a labile hydroxyl-containing compound is as follows:

To a stirred solution of the mercaptan, acid catalyst, and solvent under nitrogen atmosphere is added the hydroxy-containing compound either neat or in solution while maintaining the temperature <45° C. The solution is then heated to 45–75° C. for between 1 to 10 hours and conversion to product is monitored by gas chromatography and iodine titration for %SH. Optionally, an azeotropic solvent is chosen for removal of reaction water by an appropriate means at reflux temperatures, typically 60–120° C. Completion of reaction is achieved after the theory amount of water has been collected. The acid catalyst is removed by alkaline wash and the resulting solution is dried with magnesium sulfate and filtered. The solvent is removed under reduced pressure at <55° C. to yield the latent mercaptan. This procedure is referred to hereinafter as Procedure C.

For example, 2-hydroxybenzyl alcohol condenses with mercaptoethanol in accordance with Procedure C to form 1-(2-hydroxyphenyl)-1-S-(2-hydroxyethylthio) methane.

A generalized procedure for the reaction of a free mercaptan with a glycidyl ether is as follows:

To a stirred mixture of the mercaptan and acid catalyst under nitrogen atmosphere is added the glycidyl ether, either neat or in solution, while maintaining the temperature between 25–60° C. The mixture or solution is then heated to between 50–75° C. for a period of 1 to 6 hours and conversion to product is monitored by gas chromatography and iodine titration for %SH. The acid catalyst is removed by alkaline wash, the resulting product is dried with magnesium sulfate, and filtered. The solvent, if required, is removed under reduced pressure at <55° C. to yield the latent mercaptan. For example, the reaction between mercaptoethanol and glycidyl neodecanoate (hereinafter referred to as Procedure D gives $C_9H_{19}C(=O)OCH_2CH(OH)CH_2SCH_2CH_2OH$.

A generalized procedure for the condensation of a free mercaptan with an aldehyde is as follows:

To a stirred solution of the mercaptan, acid catalyst, and azeotropic solvent under nitrogen atmosphere is added the aldehyde with heating to reflux, typically between 65–120° C., for removal of reaction water. Completion of reaction is achieved after the theoretical amount of water has been collected. Optionally, to a stirred solution of mercaptan, aldehyde, and ether is added $BF_3$-etherate dropwise under reflux conditions. The solution is refluxed for between 1 to 6 hours and conversion to product is monitored by gas chromatography. The acid catalyst is removed by alkaline wash, the solution is dried with magnesium sulfate and filtered. The solvent is removed under reduced pressure at <65° C. to yield the latent mercaptan. This generalized procedure is referred to hereinafter as Procedure E.

Examples of the blocked mercaptans of this invention include compounds having the following formulas, as each relates to FORMULA 1:

FORMULA 2.

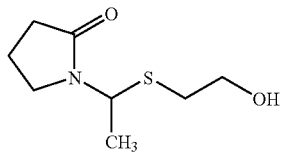

$a = 1, m = 1, n = 0; y = 1, z \text{ is } 1; X \text{ is nitrogen}, R_6 \text{ and } R_7 \text{ are joined to form } —CH_2—CH_2—CH_2—C=(O)—; R_4 \text{ is hydrogen}; R_5 \text{ is methyl; and } R_1 \text{ is hydroxyethyl}.$ -continued

3.

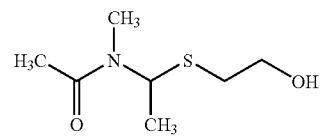

$a = 1, m = 1, n = 0; y = 1, z \text{ is } 1; X \text{ is nitrogen}, R_6 \text{ is acetyl}, R_7 \text{ is methyl}, R_5 \text{ is methyl}, R_4 \text{ is hydrogen, and } R_1 \text{ is hydroxyethyl}.$

4.

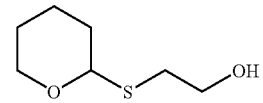

$a = 1, m = 0, n = 0; y = 1, z \text{ is } 1; X \text{ is oxygen}, R_5 \text{ and } R_7 \text{ are joined to form } —CH_2—CH_2—CH_2—CH_2—;$
$R_4 \text{ is hydrogen, and } R_1 \text{ is hydroxyethyl}.$

5.

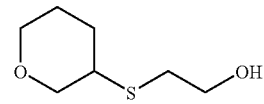

$a = 1, m = 0, n = 1, y = 1, z = 1; X \text{ is oxygen}, R_3 \text{ and } R_7 \text{ join to form } —CH_2—CH_2—CH_2—; R_2, R_3, \text{ and } R_5 \text{ are hydrogen, and } R_1 \text{ is hydroxyethyl}.$

6.

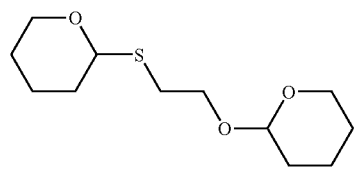

$a = 1, m = 0, n = 0, y = 1, z = 1; X \text{ is oxygen}, R_5 \text{ and } R_7 \text{ join to form } —CH_2—CH_2—CH_2—CH_2—; R_4 \text{ is hydrogen, and } R_1 \text{ is } 2\text{-tetrahydro-pyranyloxyethyl}.$

7.

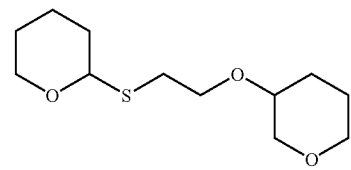

$a = 1, m = 0, n = 0, y = 1, z = 1; X \text{ is oxygen}, R_5 \text{ and } R_7 \text{ join to form } —CH_2—CH_2—CH_2—CH_2—; R_4 \text{ is hydrogen, and } R_1 \text{ is } 3\text{-tetrahydro-pyranyloxyethyl}.$

8.

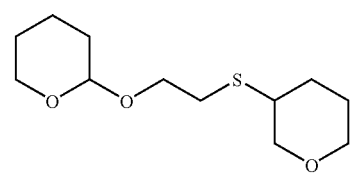

$a = 1, m = 0, n = 1, y = 1, z = 1; X \text{ is oxygen}, R_3 \text{ and } R_7 \text{ join to form } —CH_2—CH_2—CH_2—; R_2, R_4 \text{ and } R_5 \text{ are hydrogen, and } R_1 \text{ is } 2\text{-tetrahydro-pyranyloxyethyl}.$

9.

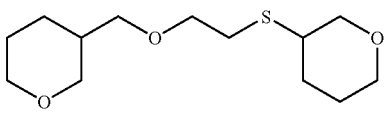

a = 1, m = 0, n = 1, y = 1, z = 1; X is oxygen, $R_3$ and $R_7$ join to form
—$CH_2$—$CH_2$—$CH_2$—; $R_2$, $R_4$ and $R_5$ are hydrogen,
and $R_1$ is 3-tetrahydro-pyranyloxyethyl.

10a.

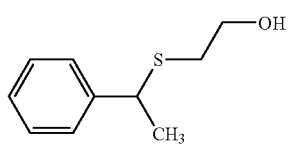

a = 0, m = 0, n = 0, y = 1, z = 1; X is phenyl, $R_4$ is methyl, $R_5$ is
hydrogen, and $R_1$ is hydroxyethyl.

10b.

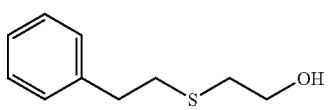

a = 0, m = 0, n = 1, y = 1, z = 1; X is phenyl, $R_2$, $R_3$, $R_4$,
and $R_5$ are hydrogen, and $R_1$ is hydroxyethyl.

11.

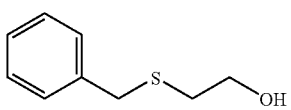

a = 0, m = 0, n = 0, z = 1; y = 1, X is phenyl,
$R_4$ and $R_5$ are hydrogen, and $R_1$ is hydroxyethyl.

12.

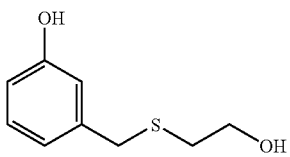

a = 1, m = 0, n = 0, y = 1, z = 1; X is phenyl,
$R_4$ and $R_5$ are hydrogen, $R_7$ is o-hydroxy and $R_1$ is hydroxyethyl.

13.

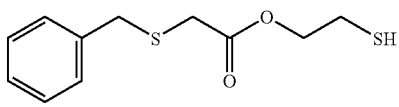

a = 0, m = 0, n = 0, y = 1, z = 1; X is phenyl,
$R_4$ and $R_5$ are hydrogen, and $R_1$ is mercaptoethoxycarbonylmethyl.

14.

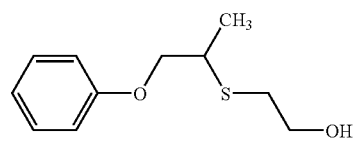

a = 1, m = 0, n = 1, y = 1, z = 1; X is oxygen, $R_2$ and $R_5$ are
hydrogen, and $R_3$ is methyl, $R_7$ is phenyl, and $R_1$ is hydroxyethyl.

15.

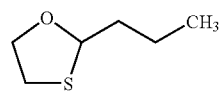

a = 1, m = 0, n = 0, y = 1, z = 1; X is oxygen, $R_7$ and $R_1$ are
joined to form an ethylenyl radical, $R_4$ is hydrogen, and $R_5$ is propyl.

16.

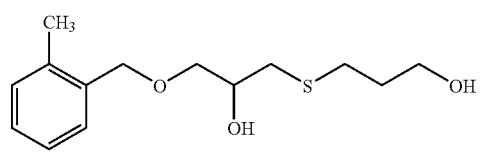

a = 0, m = 1, n = 1, y = 1, z = 1; X is oxygen, $R_2$, $R_3$, $R_6$ and $R_4$ are
hydrogen, $R_5$ is 2-methyleneoxytolyl, and $R_1$ is hydroxyethyl.

17.

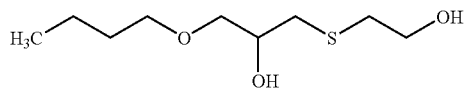

a = 1, m = 0, n = 1, y = 1, z = 1; X is oxygen, $R_2$, $R_3$, $R_4$ and $R_7$ are
hydrogen, $R_5$ is butoxymethyl, and $R_1$ is hydroxyethyl.

18.

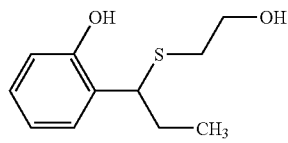

a = 1, m = 0, n = 0, y = 1, z = 1; X is phenyl, $R_4$ is hydrogen, $R_5$ is
ethyl, $R_7$ is o-hydroxy, and $R_1$ is hydroxyethyl.

19.

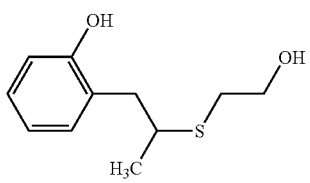

a = 1, m = 0, n = 1, y = 1, z = 1; X is phenyl, $R_3$, $R_4$ and $R_5$ are
hydrogen, $R^2$ is methyl, $R^7$ is o-hydroxy, and $R^1$ is hydroxyethyl.

-continued

20.

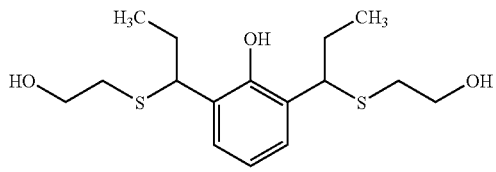

a = 1, m = 0, n = 0, y = 1, z = 2; X is phenyl, $R_4$ is hydrogen, $R_5$ is ethyl, $R_7$ is o-hydroxy, and $R_1$ is hydroxyethyl.

21.

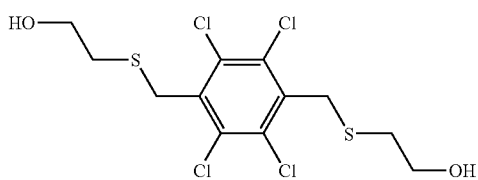

a = 0, m = 0, n = 0, y = 1, z = 2; X is tetrachlorophenyl, $R_4$ and $R_5$ are hydrogen, and $R_1$ is hydroxyethyl.

22.

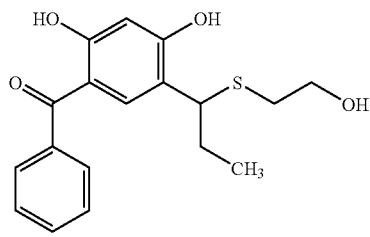

a = 1, m = 0, n = 0, y = 1, z = 1; X is o, p-dihydroxyphenyl, $R_7$ is m-phenylcarbonyl, $R_4$ is hydrogen, $R_5$ is ——$CH_2CH_3$, and $R_1$ is hydroxyehthyl.

23.

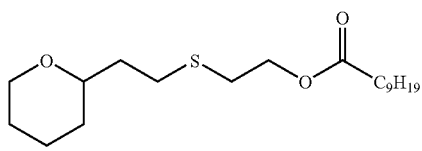

a = 1, m = 0, n = 0, y = 1, z is 1; X is oxygen, $R_5$ and $R_7$ are joined to form ——$CH_2$——$CH_2$——$CH_2$——$CH_2$——; $R_4$ is hydrogen, and $R_1$ is decanoyloxyethyl.

Examples of the thus described compounds which are particularly useful in the stabilization of PVC compositions include the 2-S-(tetrahydropyranyl)thioglycolic acid esters of alkanols such as 2-ethylhexanol, octanol, and dodecanol, and the furanyl homologs thereof.

Zinc chloride and, preferably, zinc carboxylates are suitable for use as the zinc salt in the stabilizer composition of this invention. The number of carbon atoms in the zinc carboxylate is from 2 to 22, preferably from 8 to 18. Examples of the carboxylic acids from which the carboxylates originate include aliphatic and aromatic acids such as acetic, propionic, butyric, n-octanoic, 2-ethylhexanoic, dodecanoic, myristic, oleic, stearic, benzoic, phenylacetic, and other aromatic acids. Zinc octanoate, zinc 2-ethylhexanoate, zinc palmitate, zinc laurate, zinc oleate, and zinc stearate are particular examples of the carboxylates that are useful in the polymer composition of this invention. Mixtures of the carboxylates are useful, also.

From 0–30% of an epoxy compound, based on the weight of the halogen-containing polymer, may be used as a co-stabilizer in the compositions of this invention. Examples of the epoxy compounds suitable for the purposes of this invention include epoxidized vegetable oils such as soybean oil, lard oil, olive oil, linseed oil, and cottonseed oil.

Organic phosphites containing one or more, up to a total of three, aryl, alkyl, aralkyl and alkaryl groups, in any combination also are suitable as co-stabilizers for the purposes of this invention. The organic phosphites are used in an amount of from 0 to 10% on a weight basis.

For the purposes of this invention, metallic-based stabilizers are defined as being metal salts and organometallic salts other than zinc salts. The metal salts include oxides, hydroxides, sulfides, sulfates, chlorides, bromides, fluorides, iodides, phosphates, phenates, perchlorates, carboxylates, and carbonates of metals. The metals are exemplified by barium, strontium, calcium, tin, magnesium, cobalt, nickel, titanium, antimony, and aluminum. The amount of the metallic-based stabilizer is from 0 to 4 phr, preferably 0.25 to 2 phr, by weight of the halogen containing resin.

Conventional organometallic stabilizers include the organotin carboxylates and mercaptides such as those set forth in U.S. Pat. Nos. 3,078,290 and 2,985,617. Monosulfides and/or polysulfides of the organotin mercaptides of mercaptoalkyl carboxylates and/or alkyl thioglycolates are also suitable as metal-based stabilizers in the compositions of this invention. The sulfides may be made by heating stoichiometric quantities of a mercaptoalkyl ester of a carboxylic acid or an alkyl mercaptocarboxylate and an organotin chloride having the formula $R'_{(4-z)}SnHal_z$ wherein $R'$ is an alkyl group having from 1 to 12 carbon atoms, Hal is a halogen having an atomic weight of from 35 to 127, preferably chlorine, and z is any number from 1 to 3; in water and ammonium hydroxide to about 30° C.(86° F.), slowly adding an alkali metal mono- or polysulfide, and heating the reaction mixture further to about 45° C. before separating the product from said mixture.

It should be understood that the structures of the sulfides produced by the process mentioned above are very complex. The reactions are believed to produce an equilibrium mixture composed of several different but related products. As will be appreciated by those of ordinary skill in chemistry, equilibrium mixtures inherently include the starting materials as well as the products of any reaction between them.

In addition to the epoxy compounds and organic phosphites mentioned above, other conventional non-metallic stabilizers can also be included in the polymer compositions of the present invention. Thus, there can be included from 0 to 3 phr, by weight of a nitrogen-containing stabilizer such as dicyandiamide, hindered amines melamine, urea, and the 1,3-dialkyl-6-amino-uracil derivatives described in German Offenlegungsschrift 19,741,778 by Ciba Specialty Chemicals Holding Inc. The uracils may be prepared by the method described by S. Senda and K. Hirota in Chem. Pharm. Bull., 22(7), 1459–1467(1974) or by the reaction of the corresponding aminouracil with molar excesses of chloroacetaldehyde and ammonium acetate in water at about 65° C. until a precipitate forms or with molar excesses of acetoxyacetone and ammonium acetate in water at reflux for 12 hours. The pyrrolodiazine diones described in published Australian Patent Application No. AU-A-48232/96 by Ciba-Geigy, and the like may also be used in this invention as a co-stabilizer.

Likewise a polyol stabilizer can be used in an amount of from 0–2 phr by weight of the halogen-containing polymer. Such a stabilizer is exemplified by glycerol, sorbitol, pentaerythritol, poly(vinyl alcohol),.glyceryl mono-oleate, glyceryl mono-acetate, and glyceryl monostearate.

The stabilizer compositions of this invention comprise the sulfur compound, the zinc salt, and the zinc inhibitor and are particularly suited to impart both good early color and long term stabilization against the deteriorative effects of heat and ultra-violet light on both rigid and flexible PVC resins and other halogen-containing polymers. They may be prepared by blending the sulfur compound, zinc salt, the liquid calcium soap and/or the 1,3,5-tris(2-hydroxyethyl)isocyanuric acid, and other additives in any convenient manner that produces a homogeneous mixture, such as by shaking or stirring in a container.

The amount of the sulfur compound in the stabilizer composition is from 25% to 98% by weight. In a stabilizer composition in which the zinc inhibitor is the liquid calcium soap, the amount of the liquid calcium soap is such that it provides from 0.1 to 8%, preferably from 0.3 to 7.5%, and more preferably, from 0.5 to 3% by weight of calcium, measured as $Ca^{++}$ ion. The amount of zinc salt is such that it provides from 0.1 to 5%, preferably from 0.5 to 4 %, and more preferably from 0.7 to 3% of zinc, measured as $Zn^{++}$ ion. In a stabilizer composition in which the zinc inhibitor is the 1,3,5-tris(2-hydroxyethyl)isocyanuric acid (THEIC), the amount of THEIC is from 0.1 to 3%, preferably from 0.2 to 2.5%, and more preferably, from 0.3 to 2%. The amount of the zinc salt in such a stabilizer composition is such that it provides from 0.1 to 5%, preferably from 0.2 to 4%, more preferably from 0.3 to 3.5% of zinc, measured as $Zn^{++}$ ion. All amounts are based on the weight of the stabilizer composition.

It will be readily apparent to one of ordinary skill in the art that the precise amount of stabilizer composition used will depend upon several factors, including, but not limited to, the particular halogen-containing organic polymer employed, the temperature to which the polymer will be subjected, and the possible presence of other stabilizing compounds. In general, the more severe the conditions to which the halogen-containing organic polymer is subjected, and the longer the term required for resisting degradation, the greater will be the amount of stabilizer composition required. Thus, the halogen-containing polymer composition of this invention may comprise from 0.03 to 5%, preferably from 0.1 to 5%, of the stabilizer composition.

The level of the sulfur compound in the polymer composition of this invention is preferably from 0.1 to 4%, preferably from 0.2 to 3.5%, and more preferably from 0.3 to 2.5 % by weight. Particularly preferred rigid polymer compositions contain from 0.2 to 0.8% by weight of the sulfur compound and particularly preferred flexible polymer compositions contain from 0.5 to 4%, more preferably from 0.5 to 3.6%, of the sulfur compound by weight.

The stabilizer compositions of this invention can be incorporated in a halogen-containing polymer by admixing the components of the stabilizer composition and the polymer composition in an appropriate mill or mixer or by any other of the well-known methods that provide uniform distribution of the stabilizer throughout the polymer composition.

In addition to the stabilizer compositions of this invention, the halogen-containing polymer compositions of this invention may contain plasticizers and conventional additives such as pigments, fillers, blowing agents, dyes, ultraviolet light absorbing agents, antioxidants, densifying agents, biocides, and lubricants.

The following examples further illustrate the preparation of blocked mercaptans of this invention, the use of free mercaptans and zinc mercaptides in this invention, the preparation of stabilizer compositions of this invention, and the advantages of said free mercaptans and blocked mercaptans in combination with liquid calcium soaps and zinc salts in said stabilizer compositions. All parts are parts by weight unless otherwise indicated.

The Preparation of Blocked Mercaptans

REFERENCE EXAMPLE 1

H—NMR spectroscopy was used to determine the molecular structure of 2-S-(decanoyloxyethylthio) tetrahydropyran or 2-S-(tetrahydropyranyl)thioethylcaprate which was prepared by adding 42.0 grams (0.50 mole) of 3,4-dihydropyran to 112.2 grams (0.50 equivalent) of mercaptoethylcaprate (14.7% SH) in the presence of an acid catalyst over a period of 45 minutes while maintaining a nitrogen atmosphere and a temperature below 35° C. and then heating it to 50° C. and holding that temperature for 1.5 hours. After cooling the solution, it was washed with two 200 ml portions of a 10% sodium bicarbonate solution in water, followed by a 200 ml wash with water. The organic layer was dried with MgSO4 to yield a light yellow liquid having an SH content of less than 0.5% as determined by titration with a 0.100 N iodine solution in isopropanol. The $^1H$—NMR (CDCl$_3$,*) spectrum was: 2.3 (2H, t, —C(═O)—C$\underline{H}_2$—CH$_2$), 2.8 (2H, m, —S—C$\underline{H}_2$—CH$_2$—), 4.2 (2H, m, —S—CH$_2$C$\underline{H}_2$—O—), 4.9 (1H, m,—O—C$\underline{H}$(—S—CH$_2$—)—CH$_2$—CH$_2$—).

REFERENCE EXAMPLE 2

2-S-(tetrahydropyranyl)-(2-ethylhexyl)thioglycolate is prepared by adding 172.45 grams (2.05 equiv.) of 3,4-dihydro(2H)pyran (DHP) dropwise to 472 grams (2.00 equiv.) of 2-ethylhexyl thioglycolate containing 0.9 gram of methanesulfonic acid (70% active) over a period of 45 minutes under a nitrogen blanket and a temperature between 25–35° C. and heating to 35–40° C. for 2 hours. The reaction mixture is cooled before being vacuum filtered through carbon black to yield the desired product.

Preparation of Zinc Mercaptide of 2-Ethylhexylthioglycolate

REFERENCE EXAMPLE 3

To a vigorously stirred mixture of 400 grams (1.39 moles) of the product of Reference Example 2, 100 grams (0.5 mole) of 2-ethylhexylthioglycolate, and 250 grams of water in a one liter round bottom flask equipped with a stirrer there was added a mixture of 27.9 grams of ammonia and 66.7 grams of a 50% solution of zinc chloride (0.25 mole) while maintaining a temperature of 25–35° C. with the aid of an ice-water bath. The pH of the mixture was then raised from 4.9 to 7.4 by adding ammonia. After 0.5 hour of stirring, the pH was adjusted from 5.0 to 7.0 with ammonia. The mixture was poured into a separatory funnel and the bottom layer was returned to the reaction flask after 0.5 hour and heated to 75° C. under a reduced pressure of 20 mm (Hg) for one hour. After cooling, the mixture was filtered through Whatman paper to give a satisfactory product containing about 22% by weight of the desired zinc mercaptide of 2-ethylhexylthioglycolate.

The Preparation of Stabilizer Compositions of this Invention

EXAMPLE 1 AND COMPARATIVE EXAMPLE 1

Rigid PVC compositions containing:

| COMPONENT | Ex. 1 | C.E. 1 |
|---|---|---|
| PVC resin (Shell 6704) | 100.0 | 100.0 |
| Calcium carbonate | 2.0 | 2.0 |
| $TiO_2$ | 0.2 | 0.2 |
| XL-165 wax | 1.1 | 1.1 |
| Calcium stearate | 0.4 | 0.4 |
| Oxidized polyethylene | 0.15 | 0.15 |
| DHP/2-Ethylhexyl thioglycolate | 0.4 | 0.4 |
| 2-Ethylhexyl thioglycolate | 0.1 | 0.1 |
| Zinc octanoate | 0.1 | 0.1 |
| Liquid calcium versalate (10%$_w$ calcium) | 0.6 | — |
| Solid calcium 2-ethylhexanoate (12.27%$_w$ calcium) | — | 0.489 | were processed on a standard horizontal two-roll mill at roll speeds of 30F/40R at 390° F. (199° C.) with chips taken at one minute intervals to a maximum of 12 minutes. The color properties of the chips were measured against a white tile standard using a Hunter Labs Colorimeter and the dE values were selected for comparison in Table I.

TABLE I

| | dE Time (minutes) | | | | | | | | | | | |
|---|---|---|---|---|---|---|---|---|---|---|---|---|
| Example | 1 | 2 | 3 | 4 | 5 | 6 | 7 | 8 | 9 | 10 | 11 | 12 |
| 1 | 9.3 | 9.9 | 11.5 | 13.4 | 14.8 | 15.2 | 17.4 | 22.3 | 26.1 | 27.9 | 29.1 | 33.4 |
| C.E. 1 | 9.2 | 9.4 | 9.6 | 10.6 | 12.3 | 16.7 | 22.1 | 27.3 | 32.2 | 35.5 | 36.7 | 48.5 |

EXAMPLE 2 AND COMPARATIVE EXAMPLE 2

Rigid PVC compositions having the same formulations as in Example 1 and Comparative Example 1 were processed in a Brabender Plasticorder PL2000/PL2100 mixer at 374° F. (190° C.) and a mixer speed of 60 rpm with chips taken at one-minute intervals to a maximum of 11 minutes. The color properties of the chips were measured against a white tile standard using a Hunter Labs Colorimeter and the dE values were selected for comparison in Table II.

TABLE II

| | dE Time (minutes) | | | | | | | | | | |
|---|---|---|---|---|---|---|---|---|---|---|---|
| Example | 1 | 2 | 3 | 4 | 5 | 6 | 7 | 8 | 9 | 10 | 11 |
| 2 | 17.1 | 18.0 | 19.5 | 21.8 | 23.8 | 27.0 | 31.8 | 32.2 | 34.0 | 42.5 | 47.3 |
| C.E. 2 | 16.8 | 18.5 | 19.9 | 23.8 | 28.3 | 34.7 | 39.1 | 49.7 | 64.5 | char | — |

EXAMPLE 3 AND COMPARATIVE EXAMPLE 3

Rigid PVC compositions containing:

| COMPONENT | AMOUNT | |
|---|---|---|
| | Ex. 3 | C.E. 3 |
| PVC resin (Shell 6704) | 100.0 | 100.0 |
| Calcium carbonate | 2.0 | 2.0 |
| TiO$_2$ | 0.2 | 0.2 |
| XL-165 | 1.1 | 1.1 |
| Calcium stearate | 0.4 | 0.4 |
| Oxidized polyethylene | 0.15 | 0.15 |
| DHP/2-Ethylhexyl thioglycolate | 0.85 | 0.85 |
| 2-Ethylhexyl thioglycolate | 0.1 | 0.1 |
| Zinc octanoate | 0.08 | 0.08 |
| Liquid calcium versalate | 0.6 | — | were processed on a standard horizontal two-roll mill at roll speeds of 30F/40R at 390° F. (199° C.) with chips taken at one minute intervals to a maximum of 12 minutes. The color properties of the chips were measured against a white tile standard using a Hunter Labs Colorimeter and the dE values were selected for comparison in Table III.

TABLE III

| | DE Time (minutes) | | | | | | | | | | | |
|---|---|---|---|---|---|---|---|---|---|---|---|---|
| Example | 1 | 2 | 3 | 4 | 5 | 6 | 7 | 8 | 9 | 10 | 11 | 12 |
| 3 | 17.3 | 18.0 | 19.7 | 20.3 | 20.5 | 21.5 | 23.9 | 25.8 | 26.8 | 28.9 | 33.8 | 50.1 |
| C.E. 3 | 16.2 | 16.9 | 17.0 | 17.8 | 18.9 | 24.3 | 57.7 | char | — | — | — | — |

EXAMPLE 4 AND COMPARATIVE EXAMPLE 4

Rigid PVC compositions having the same formulations as in Example 3 and Comparative Example 3 were processed in a Brabender Plasticorder PL2000/PL2100 mixer at 374° F. (190° C.) and a mixer speed of 60 rpm with chips taken at one-minute intervals to a maximum of 11 minutes. The color properties of the chips were measured against a white tile standard using a Hunter Labs Colorimeter and the dE values were selected for comparison in Table IV.

TABLE IV

| | DE Time (minutes) | | | | | | | | | | |
|---|---|---|---|---|---|---|---|---|---|---|---|
| Example | 1 | 2 | 3 | 4 | 5 | 6 | 7 | 8 | 9 | 10 | 11 |
| 4 | 18.4 | 19.6 | 20.2 | 21.0 | 21.4 | 24.1 | 26.0 | 28.9 | 35.6 | char | — |
| C.E. 4 | 16.8 | 18.0 | 18.2 | 19.8 | 23.1 | 42.2 | char | — | — | — | — |

EXAMPLES 5 AND 6

Rigid PVC compositions containing:

| COMPONENT | AMOUNT | |
| --- | --- | --- |
| | Ex. 5 | Ex. 6 |
| PVC resin (Occidental 225PG 3-9-5041) | 100.0 | 100.0 |
| Calcium carbonate (OMYA Lite 50H) | 2.0 | 2.0 |
| XL-165 Wax | 1.1 | 1.1 |
| Calcium stearate | 0.4 | 0.4 |
| Oxidized polyethylene | 0.15 | 0.15 |
| DHP/2-Ethylhexyl thioglycolate | 0.4 | — |
| Zinc octanoate | 0.08 | 0.08 |
| Liquid calcium versalate | 0.6 | 0.6 | were processed on a standard horizontal two-roll mill at roll speeds of 30F/40R at 390° F. (199° C.) with chips taken at one minute intervals to a maximum of 12 minutes. The color properties of the chips were measured against a white tile standard using a Hunter Labs Colorimeter and the dE values were selected for comparison in Table V.

TABLE V

| | DE Time (minutes) | | | | | | | | | | | |
| --- | --- | --- | --- | --- | --- | --- | --- | --- | --- | --- | --- | --- |
| Example | 1 | 2 | 3 | 4 | 5 | 6 | 7 | 8 | 9 | 10 | 11 | 12 |
| 5 | 16.2 | 17.8 | 18.8 | 19.6 | 20.1 | 20.5 | 21.7 | 22.4 | 25.7 | 29.3 | 32.2 | 35.8 |
| 6 | 16.2 | 18.1 | 17.8 | 18.6 | 19.5 | 19.6 | 22.4 | 26.3 | 31.0 | 34.9 | 39.2 | 48.2 |

EXAMPLE 7 AND COMPARATIVE EXAMPLE 5

Rigid PVC compositions containing:

| COMPONENT | AMOUNT | |
| --- | --- | --- |
| | Ex. 7 | C.E. 5 |
| PVC resin (Shell 6704) | 100.0 | 100.0 |
| Calcium carbonate | 5.0 | 5.0 |
| TiO$_2$ | 0.2 | 0.2 |
| XL-165 | 1.2 | 1.2 |
| Calcium stearate | 0.45 | 0.45 |
| Oxidized polyethylene | 0.1 | 0.1 |
| Stearic acid | 0.05 | 0.05 |
| Product of reference example 3 | 0.7 | 0.7 |
| Liquid calcium versalate (10% calcium) | 0.6 | — | were processed on a standard horizontal two-roll mill at roll speeds of 30F/40R at 390° F. (199° C.) with chips taken at one minute intervals to a maximum of 12 minutes. The color properties of the chips were measured against a white tile standard using a Hunter Labs Colorimeter and the dE values were selected for comparison in Table VI.

TABLE VI

| | DE Time (minutes) | | | | | | |
| --- | --- | --- | --- | --- | --- | --- | --- |
| Example | 1 | 2 | 3 | 4 | 5 | 6 | 7 |
| 7 | 14.9 | 17.3 | 16.8 | 18.1 | 20.6 | 26.0 | Char |

TABLE VI-continued

| | DE Time (minutes) | | | | | | |
| --- | --- | --- | --- | --- | --- | --- | --- |
| Example | 1 | 2 | 3 | 4 | 5 | 6 | 7 |
| C.E. 5 | 13.5 | 15.2 | 17.0 | 30.5 | char | — | — |

EXAMPLE 8 AND COMPARATIVE EXAMPLE 6

Rigid PVC compositions containing:

| COMPONENT | AMOUNT | |
| --- | --- | --- |
| | Ex. 1 | C.E. 1 |
| PVC resin (Shell 6704) | 100.0 | 100.0 |
| Calcium carbonate | 5.0 | 5.0 |
| TiO$_2$ | 0.2 | 0.2 |
| XL-165 wax | 1.2 | 1.2 |
| Calcium stearate | 0.45 | 0.45 |
| Oxidized polyethylene | 0.1 | 0.1 |
| Stearic acid | 0.05 | 0.05 |
| DHP/2-Ethylhexyl thioglycolate | 0.3 | 0.3 |
| 2-Ethylhexyl thioglycolate | 0.2 | 0.2 |
| Zinc octanoate | 0.12 | 0.12 |
| THEIC | 0.15 | — | were processed on a standard horizontal two-roll mill at roll speeds of 30F/40R at 390° F. (199° C.) with chips taken at one minute intervals to a maximum of 9 minutes. The color properties of the chips were measured against a white tile standard using a Hunter Labs Colorimeter and the dE values were selected for comparison in Table VII.

TABLE VII

| | DE Time (minutes) | | | | | | | | | | | |
|---|---|---|---|---|---|---|---|---|---|---|---|---|
| Example | 1 | 2 | 3 | 4 | 5 | 6 | 7 | 8 | 9 | 10 | 11 | 12 |
| 8 | 12.6 | 13.4 | 14.1 | 18.7 | 24.5 | 33.5 | 40.7 | 47.7 | 58.0 | N.A. | N.A. | N.A. |
| C.E. 6 | 13.5 | 14.3 | 15.1 | 30.0 | 60.1 | N.A. | N.A. | N.A. | N.A. | N.A. | N.A. | N.A. |

EXAMPLE 9 AND COMPARATIVE EXAMPLE 7

Rigid PVC compositions containing:

| | AMOUNT | |
|---|---|---|
| COMPONENT | Ex. 2 | C.E. 2 |
| PVC resin (Shell 6704) | 100.0 | 100.0 |
| Calcium carbonate | 5.0 | 5.0 |
| TiO$_2$ | 0.2 | 0.2 |
| XL-165 wax | 1.2 | 1.2 |
| Calcium stearate | 0.45 | 0.45 |
| Oxidized polyethylene | 0.1 | 0.1 |
| Stearic acid | 0.05 | 0.05 |
| Product of reference Example 3 | 0.7 | 0.7 |
| THEIC | 0.15 | — | were processed on a standard horizontal two-roll mill at roll speeds of 30F/40R at 390° F. (199° C.) with chips taken at one minute intervals to a maximum of 10 minutes. The color properties of the chips were measured against a white tile standard using a Hunter Labs Colorimeter and the dE values were selected for comparison in Table VIII.

TABLE VIII

| | DE Time (minutes) | | | | | | | | | | |
|---|---|---|---|---|---|---|---|---|---|---|---|
| Example | 1 | 2 | 3 | 4 | 5 | 6 | 7 | 8 | 9 | 10 | 11 |
| 9 | 14.3 | 14.9 | 16.1 | 19.6 | 25.9 | 34.0 | 40.3 | 46.1 | 54.2 | 54.4 | N.A. |
| C.E. 7 | 13.7 | 15.0 | 16.5 | 28.5 | 53.9 | N.A. | N.A. | N.A. | N.A. | N.A. | N.A. |

COMPARATIVE EXAMPLE 8

A rigid PVC composition containing:

| COMPONENT | AMOUNT |
|---|---|
| PVC resin (Shell 6704) | 100.0 |
| Calcium carbonate | 2.0 |
| TiO$_2$ | 0.2 |
| XL-165 | 1.1 |
| Calcium stearate | 0.4 |
| Oxidized polyethylene | 0.15 |
| Stearic acid | 0.05 |
| THEIC | 0.15 | was processed on a standard horizontal two-roll mill at roll speeds of 30F/40R at 390° F. (199° C.) with chips taken at one minute intervals to a maximum of 7 minutes. The color properties of the chips were measured against a white tile standard using a Hunter Labs Colorimeter and the dE values were selected for comparison in Table IX.

TABLE III

| | DE Time (minutes) | | | | | | | | | | | |
|---------|------|------|------|------|------|------|------|------|------|------|------|------|
| Example | 1 | 2 | 3 | 4 | 5 | 6 | 7 | 8 | 9 | 10 | 11 | 12 |
| C.E. 8 | 35.5 | 58.8 | 62.0 | 63.8 | 63.9 | 64.8 | 63.8 | N.A. | N.A. | N.A. | N.A. | N.A. |

Thus, the effectiveness of the zinc inhibitors in the stabilizer compositions of this invention is shown by these results.

Articles of manufacture contemplated by this invention, e.g. packaging film, tubing, rigid pipe, and window profile, are formed from the stabilized compositions of this invention by any of the well-known conventional techniques for forming polymers into shaped articles.

The invention claimed is:

1. An organic based composition comprising at least one organic based heat stabilizer component, which comprises a zinc salt and at least one sulfur compound selected from the group consisting of a free mercaptan, a zinc mercaptide, and a latent mercaptan; and at least one stabilizer modifying component selected from the group consisting of liquid calcium soap and 1,3,5-tris (2-hydroxyethyl) cyanuric acid, wherein said liquid calcium soap is substantially free of other metal salts and comprises a solution of a calcium soap which is a liquid at 105° C.

2. The composition of claim 1 wherein the latent mercaptan has the structure:

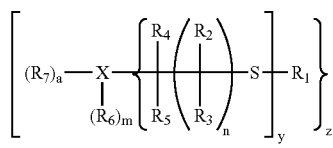

wherein a is 0 or 1, m and n are 0 or 1; y=1 to 4; when y=1, z is 1 to 4; and when y is more than 1, z is 1; $R_1$ is an alkyl, alkylenyl, cycloalkyl, cycloalkylenyl, aryl, alkaryl, aralkyl, aralkylenyl, hydroxyalkyl, dihydroxyalkyl, hydroxy(polyalkoxy)alkyl, alkoxyalkyl, hydroxyalkoxyalkyl, alkoxy(hydroxyalkyl), alkoxy(acyloxyalkyl), alkoxy(polyalkoxy)alkyl, alkoxy(polyalkoxy)carbonylalkyl, carboxyalkyl, acyloxyalkyl, acyloxy(hydroxyalkyl), acyloxyalkoxyalkyl, acyloxy (polyalkoxy)alkyl, benzoyloxy(polyalkoxy)alkyl, alkylenebis-( acyloxyalkyl), alkoxycarbonylalkyl, alkoxycarbonylalkylenyl, hydroxyalkoxycarbonylalkyl, hydroxy(polyalkoxy)carbonylalkyl, mercaptoalkyl, mercaptoalkylenyl, mercaptoalkoxycarbonylalkyl, mercaptoalkoxycarbonylalkylenyl, alkoxycarbonyl (amido)alkyl, alkylcarbonyloxy(polyalkoxy)carbonylalkyl, tetrahydopyranyloxy(polyalkoxy)carbonylalkyl, tetrahydropyranyloxyalkyl, hydroxyaryl, mercaptoaryl or carboxyaryl radical having from 1 to 22 carbon atoms; $R_2, R_3, R_4, R_5, R_6$, and $R_7$ are independently hydrogen, a hydroxyl, mercapto, acyl, alkyl, alkenyl, alkylenyl, aryl, haloaryl, alkaryl, aralkyl, hydroxyalkyl, mercaptoalkyl, hydroxyaryl, alkoxyaryl, alkoxyhydroxyaryl, mercaptoaryl groups having from 1 to 22 carbon atoms; X is aryl, haloaryl, alkaryl, aralkaryl, hydroxyaryl, dihydroxyaryl, arylcycloalkyl, or a heteroatom, with the option that when a is 1 and m is 1, $R_6$ and $R_7$ form a heterocyclic moiety in conjunction with X as nitrogen, and with the further option that when a=1 and in 0, one of $R_1$, $R_3$, and $R_5$ joins with $R_7$ and X to form a heterocyclic moiety with X as a heteroatom selected from the group consisting of oxygen and sulfur, with the proviso that z is 1 or 2 when X is aralkaryl, $R_6$ and $R_7$ are hydroxyl, a is 1 and m is 1, and with the further proviso that when $R_6$ is not hydroxyl or mercapto, z is 1.

3. The composition of claim 1 wherein the zinc salt is a zinc carboxylate.

4. The composition of claim 1 wherein said liquid form of a calcium soap provides from 0.1 to 8% of calcium, measured as $Ca^{++}$ ion, by weight of the organic based composition.

5. The composition of claim 1 wherein the amount of the 1,3,5 tris-(2-hydroxyethyl) isocyanuric acid is from 0.1 to 3% by weight of the organic based composition.

6. The composition of claim 1 wherein said zinc salt provides from 0.1 to 5% of zinc, measured as $Zn^{++}$ ion, by weight of the organic based composition.

7. A heat stabilized polymer composition comprising a halogen-containing polymer and the organic based composition of claim 1.

8. A heat stabilized polymer composition comprising a halogen-containing polymer and the organic based composition of claim 6.

* * * * *